(12) United States Patent  
Evans et al.

(10) Patent No.: US 6,449,408 B1  
(45) Date of Patent: Sep. 10, 2002

(54) SOLITON PULSE GENERATOR (75) Inventors: Alan F. Evans, Beaver Dams, NY (US); Andrew J. Stentz, Clinton, NJ (US)

(73) Assignees: Corning Incorporated, Corning, NY (US); University of Rochester, Rochester, NY (US)

( * ) Notice: Subject to any disclaimer, the term of this patent is extended or adjusted under 35 U.S.C. 154(b) by 0 days.

(21) Appl. No.: 09/529,745
(22) PCT Filed: Oct. 15, 1998
(86) PCT No.: PCT/US98/21875
§ 371 (c)(1),
(2), (4) Date: Jun. 30, 2000
(87) PCT Pub. No.: WO99/21053
PCT Pub. Date: Apr. 29, 1999

Related U.S. Application Data (60) Provisional application No. 60/062,001, filed on Oct. 17, 1997.

(51) Int. Cl.$^7$ ................ G02B 6/26; H01S 3/30
(52) U.S. Cl. .............. 385/27; 385/122; 359/124; 359/334; 359/180; 372/3
(58) Field of Search .............. 385/15, 24, 27, 385/122; 359/124, 180, 181, 334; 372/3

(56) References Cited

U.S. PATENT DOCUMENTS

| | | | |
|---|---|---|---|
| 4,530,097 A | * 7/1985 | Stokes et al. | 372/6 |
| 4,741,587 A | 5/1988 | Jewell et al. | 350/96.15 |
| 5,329,396 A | 7/1994 | Fishman et al. | 359/173 |
| 5,648,976 A | 7/1997 | Franck et al. | 372/25 |
| 5,898,714 A | 4/1999 | Morita et al. | 372/6 |
| 5,917,179 A | * 6/1999 | Yao | 250/227.11 |

FOREIGN PATENT DOCUMENTS

| | | | | |
|---|---|---|---|---|
| JP | 63-125919 | 5/1988 | | G02F/2/00 |
| JP | 03-206428 | 9/1991 | | G02F/1/35 |

* cited by examiner

Primary Examiner—John D. Lee  
Assistant Examiner—Sarah U Song  
(74) Attorney, Agent, or Firm—William J. Chervenak

(57) ABSTRACT

A soliton pulse generator is formed by providing an input continuous wave, stimulating Brillouin scattering of an input wave having a frequency determined by the frequency of the input continuous wave to generate a backscattered wave, coupling a continuous wave having a frequency determined by the input continuous wave with the backscattered wave to generate a sinusoidal output signal, and then compressing the sinusoidal output to form a soliton pulse train. Because the wavelength shift of the backscattered wave is essentially independent of the input wavelength and power, coupling of the second wave and the backscattered wave results in a highly stable and controllable sinusoidal output signal. A highly stable and controllable soliton pulse train is provided by compressing the sinusoidal signal with use of a dispersion decreasing fiber or with use of an alternative pulse compressing device.

52 Claims, 5 Drawing Sheets

SOLITON PULSE GENERATOR

This application claims priority to and incorporates herein by reference U.S. Provisional Application No. 60/1062,001 filed on Oct. 17, 1997.

BACKGROUND OF THE INVENTION:

1. Field of the Invention

The invention relates to pulse generators, and more particularly to a method and apparatus for generating a stable and controllable soliton pulse train.

2. Description of the Background

High repetition rate, low timing jitter transmitters are required for ultra-fast time division multiplexed (TDM) networks. For soliton transmitters, there is one class that generates a soliton pulse train with a repetition rate of 20 GHz to 1 THz by adiabatically compressing and reshaping a sinusoidal optical input through a pulse compressing device. Adiabatic compression ensures transform-limited (unchirped) solitons. Various methods exist for generating the sinusoidal signal that is input into the pulse compressing device.

In Swanson et al's "40 GHz Pulse Train Generation Using Soliton Compression of a Mach-Zehnder Modulator output," IEEE Photonic Technol. Lett. 7(1), 114–116 (1995), a sinusoidal signal is generated by modulating continuous wave output from a 20 GHz signal generator using a Mach-Zender modulator. While a high quality sinusoidal signal is generated using the method, the method requires expensive and sophisticated components, including the 20 GHz electrical signal generator, and the modulator.

In "40 GHz Soliton Train Generation Through Multisoliton Pulse Propagation in a Dispersion Varying Optical Fiber Circuit," IEEE Photonic Technol. Lett. 6(11) 1380–1382 (1994), Shipulin et al. describe a soliton pulse generator wherein a sinusoidal signal is generated by mixing (beating) two frequencies from two continuous wave lasers. The major disadvantage of the technique is that it is very difficult to lock the frequency between the two laser sources. Therefore, it is difficult to tune the output frequency of the generator to a desired frequency using the technique. Swanson et al. describe a soliton train generating method similar to that of Sipulin et al. in "23-GHz and 123-GHz Soliton Pulse Generating Using Two CW Lasers and Standard Single-Mode Fiber" IEEE Photonic Technol. Lett. 6(7), 796–798 (1994).

There exists a need for a method and apparatus for generating a soliton pulse train which utilizes passive and inexpensive components to generate a highly stable and controllable train of soliton pulses.

SUMMARY OF THE INVENTION

According to its major aspects and broadly stated, the present invention relates to a pulse generating method and associated circuitry which utilizes Brillouin scattering to generate a highly stable and controllable train of soliton pulses.

When Brillouin Scattering is stimulated in an optical fiber, the input signal generates acoustic waves through the process of electrostriction which in turn causes periodic modulation of the refractive index. The index grating scatters the input signal light through Bragg diffraction, and because of the Doppler shift associated with a grating moving at the acoustic velocity $\gamma_A$, scattered light is down-shifted in frequency. Stimulating Brillouin scattering in an optical fiber results in a backward propagating signal shifted in wavelength from an incident signal by a magnitude that is essentially independent of the wavelength of the input signal.

The soliton pulse generator of the invention is formed by providing an input continuous wave, stimulating Brillouin scattering of an input wave having a frequency determined by the frequency of the input continuous wave to generate a backscattered wave, coupling a continuous wave having a frequency determined by the input continuous wave with the backscattered wave to generate a sinusoidal output signal, and then compressing the sinusoidal output to form a soliton pulse train. Because the wavelength shift of the backscattered wave is essentially independent of the input power and wavelength, coupling of the continuous wave and the backscattered and wavelength-shifted wave results in a highly stable and controllable sinusoidal optical signal at an output fiber of the device. A highly stable and controllable pulse generating circuit is provided by compressing the sinusoidal signal with use of a fiber whose dispersion decreases along its length in the direction of propogation (dispersion decreasing fiber) or with use of an alternate pulse compression technique.

A fiber in which Brillouin scattering takes place is considered a Brillouin fiber for purposes of the invention. To achieve Brillouin scattering in the Brillouin fiber, the power level of the first wave must be higher than the Brillouin threshold of the fiber. The Brillouin threshold for a length of fiber is determined by the Brillouin gain of the fiber, the effective core area of the fiber and the effective interaction length of the fiber. Preferably, the parameters of the Brillouin fiber are controlled so that the fiber features a low threshold so that a high intensity backward propagating Brillouin wave is easily attained. A low Brillouin threshold can be provided by decreasing the effective core area of the fiber, by increasing the length of the fiber, or by narrowing the acoustic energy spectrum of the fiber.

A high quality sinusoidal signal is produced at the output fiber if the continuous wave and the Brillouin wave have approximately equal intensities. The intensities of the continuous wave and the Brillouin wave can be made equal by amplifying or attenuating one of the waves, or by coupling the waves in a coupler having a coupling ratio which outputs the waves at equal intensities.

An important consideration in the design of the pulse generator is to ensure that Brillouin scattering is not stimulated in the output fiber at output of the second coupler. Unwanted Brillouin scattering in the output fiber can be avoided generally by increasing the Brillouin threshold of the output fiber, or by attenuating the power level of the output signal so that it is below the Brillouin threshold of the output fiber.

The Brillouin threshold of the output fiber can be increased to avoid unwanted Brillouin scattering by decreasing the Brillouin gain in the output fiber. A small Brillouin gain can be achieved by broadening the acoustic phonon spectrum. Spectral broadening can be accomplished by one of several methods including by way of doping process wherein nonuniformities are introduced into the output fiber, by providing an output fiber having a varying diameter, or by providing an output fiber having varying draw tension.

The Brillouin threshold of the output fiber can also be increased by increasing the effective core area of the output fiber, or decreasing the interaction length of the output fiber. A pulse generator according to the present invention can be made to generate a train of pulses having a repetition rate on the order of 10 Gbps. The repetition rate is readily tunable, by adjusting the temperature of the fiber which changes the acoustic velocity of the Brillouin fiber and the Brillouin fiber's refractive index.

The 10 Gbps frequency can easily be increased by a factor of N×10 Gbps, where N is an integer, by way of time division multiplexing. In time division multiplexing, the ~10 Gbps pulse train is split using a 1×N coupler, each output path is encoded with data and delayed by $T_b/N$ (where $T_b$ is the original bit period) to interleave the pulses, and the several paths are recombined using an N×P1 coupler.

A major feature of the invention is the generation of a stable and controllable sinusoidal signal by providing an input continuous wave, stimulating Brillouin scattering of an input wave having a frequency determined by the frequency of the input continuous wave to generate a backscattered wave, and coupling a continuous wave having a frequency determined by the input continuous wave with the backscattered wave to generate a sinusoidal output signal. The frequency of the sinusoidal output wave is the difference in frequency (speed of light/wavelength) between the continuous wave input and the backscattered wave. Because the backscattered wave will have a wavelength and frequency shift essentially independent of the input wavelength, the sinusoidal output generated at the output of the second coupler will be highly stable and controllable. Further, the highly stable and controllable sinusoidal output will be generated without use of an expensive and sophisticated signal generator.

Another feature of the invention is the compression of the sinusoidal signal with use of a dispersion decreasing fiber or by an alternative method. Compressing the sinusoidal signal provides a highly stable and controllable soliton pulse train.

Another major feature of the invention is the selection of a Brillouin fiber having a core area and length selected to provide a low Brillouin threshold power level. With a low Brillouin threshold, Brillouin scattering in the Brillouin fiber is easily attained.

Another feature of the invention is the coupling ratio of the first coupler. The coupling ratio of the first coupler is selected so that the first wave coupled into the Brillouin fiber is significantly above the Brillouin threshold, and thereby produces a backscattered wave of an intensity sufficient for coupling with the second wave.

Still another feature of the invention is the adjustment (by way of amplification, attenuation, or selection an appropriate coupling ratio) of the second wave and the Brillouin wave such that the two waves have equal intensities when they are coupled. Coupling the two waves at equal intensities produces a high quality sinusoidal output having maximum intensity contrast of the temporal interference.

Yet another feature of the invention is the doping of the dispersion decreasing fiber such that its acoustic energy spectrum is broadened. Broadening the spectral profile of the acoustic wave increases the Brillouin threshold in the dispersion decreasing fiber, and thereby prevents unwanted stimulated Brillouin scattering in the dispersion decreasing fiber.

These and other features of the present invention will become apparent to those skilled in the art from a reading of the ensuing Detailed Description of the Preferred Embodiments in connection with the referenced Drawings.

DETAILED DESCRIPTION OF THE PREFERRED EMBODIMENTS

Figure 1A:
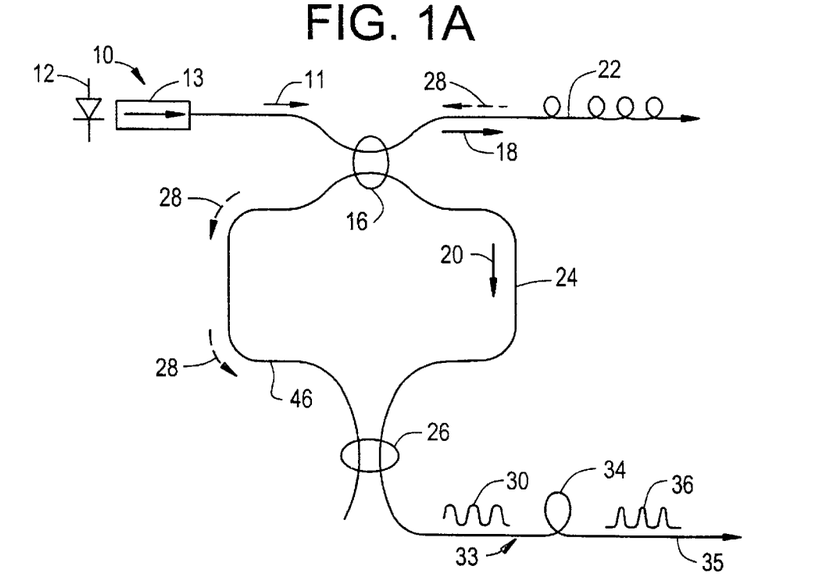
FIGS. 1A, 1B, 1C and 1D show general schematic diagrams of various alternative implementations of the invention.

Operation of the present invention is described with reference to FIGS. 1A–1D, showing variations of a general schematic diagram of a soliton pulse generator 10. In the embodiment of FIG. 1A, an optical input continuous wave 11 generated from a laser diode, 12, is input through an optical isolator 13 into an input coupler 16, which splits the optical input into continuous waves, represented as arrows 18 and 20. Input continuous wave 18 propagates along fiber 22 which is adapted so that Brillouin scattering readily takes effect in fiber 22, and is therefore referred to as Brillouin fiber 22. Continuous wave 20 propagates along fiber 24 and is input into a second coupler 26. Meanwhile, backscattered wave 28 is generated in Brillouin fiber 22 by Brillouin scattering of continuous wave 18. Propagating oppositely from continuous wave 18, backscattered wave 28 propagates through first coupler 16 and is input into second coupler 26. Coupling continuous wave 20 and backscattered wave 28 at second coupler 26 generates a sinusoidal output wave 30 at the output of second coupler 26. Output wave 30 is applied to an output fiber 33, which may comprise, for example, a dispersion decreasing fiber 34 and a transmission fiber 35. Dispersion decreasing fiber 34 or an alternative compression source (not shown) compresses sinusoidal output signal 30 to produce a soliton pulse train 36.

Figure 1B:
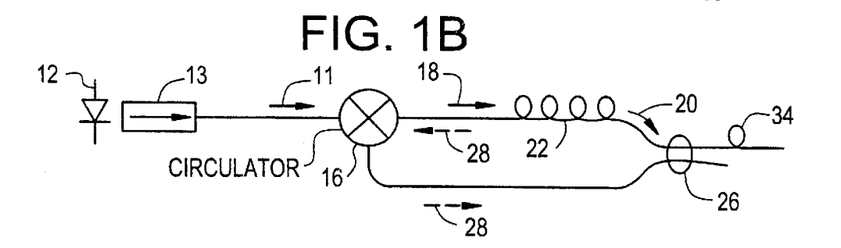
Figure 1C:
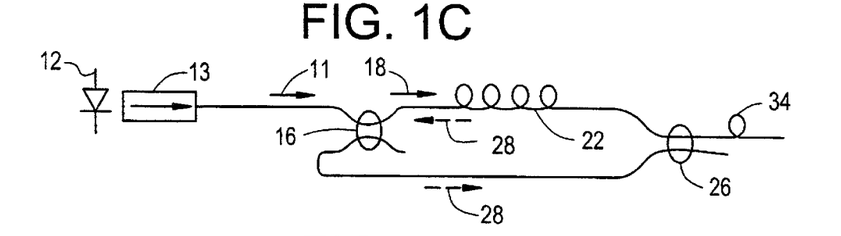

In the embodiment of FIG. 1B, the spatial separation of the backscattered, Brillouin wave from the forward going input wave is achieved with an optical circulator instead of a fiber coupler. In an optical circulator, light input into one fiber will nominally exit the circulator through the next fiber in the clockwise (or counter-clock-wise) direction. Referring to FIG. 1B, wave 11 entering from the left will exit as wave 18 to the right; the backscattered wave entering from the right will exit as wave 28 to the bottom. The embodiment of FIG. 1C uses the same fiber coupler as FIG. 1A to split off the backscattered wave. However, FIG. 1C as well as FIG. 1B use the light transmitted through the Brillouin fiber as one of the inputs to coupler 26. In FIGS. 1A–C, element 22 is a long length of optical fiber.

Figure 1D:
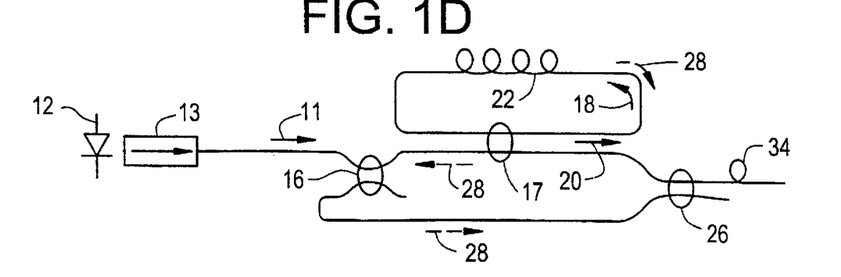

An alternate embodiment shown in FIG. 1D using the same basic configuration as FIG. 1C adds Brillouin laser coupler 17 that folds the fiber 22 back on itself. Coupler 17 creates a feedback mechanism whereby a fraction of the Brillouin wave generated in the fiber 22 is reintroduced into the loop. This feedback causes the loop to lase and is known as a Brillouin laser. It has the advantage of requiring a much shorter length of fiber and lower threshold power than the previous embodiments. It does, however, produce a down shifted wave with a much narrower spectral width. The resultant wave from coupler 26 will also have a very narrow spectral width. As will be shown from Eq. 7, this can result in a large Brillouin gain coefficient, $g_B$, in fiber 34 since $g_B$ is inversely proportional to the spectral width, $\Delta\gamma_p$. Thus, there is a tradeoff in this embodiment between suppressing stimulated Brillouin scattering in fiber 34 and enhancing stimulated Brillouin scattering in fiber 22.

Stimulated Brillouin Scattering (SBS) is an interaction between the input (forward) pump wave, backscattered (Stokes) wave, and acoustical wave of the fiber. As input power increases above the SBS power threshold, the transmitted power (wave) is clamped at a maximum value and any further increases of input power results in light being scattered in the backwards direction.

Described in terms of particles, high input power levels increase the probability that photons will collide with and give energy to acoustical photons in the fiber. Due to conservation of energy and momentum in the collision, the scattered photons become down-shifted in frequency (longer wavelength, lower energy) and are preferentially scattered directly backward along the fiber. In a wave description of the SBS process, the input pump wave sets u glass lattice vibrations through electrostriction. The acoustic vibration creates a refractive index grating traveling at an acoustic velocity such that the input wave Bragg diffracts into a Doppler-shifted, backward traveling Stokes wave (backscattered wave). The interference of the incident wave with the backscattered wave reenforces and strengthens the acoustic grating creating a feedback mechanism that nonlinearly depletes the transmitted wave as the incident power is increased. Therefore, at the onset of the SBS process, the amount of backscattered light increases abruptly. Since the acoustic grating is propagating in the forward direction, stimulated Brillouin scattering in an optical fiber results in a backward propagating doppler wave down-shifted in wavelength from an incident wave by a magnitude that is essentially independent of the wavelength of the input wave. The wavelength shift depends on the velocity of the acoustic wave. The properties of Stimulated Brillouin Scattering are thoroughly discussed in Nonlinear Fiber Optics, by Govind P. Agrawal (Academic Press, 1995), pp. 370–403.

Figure 2:
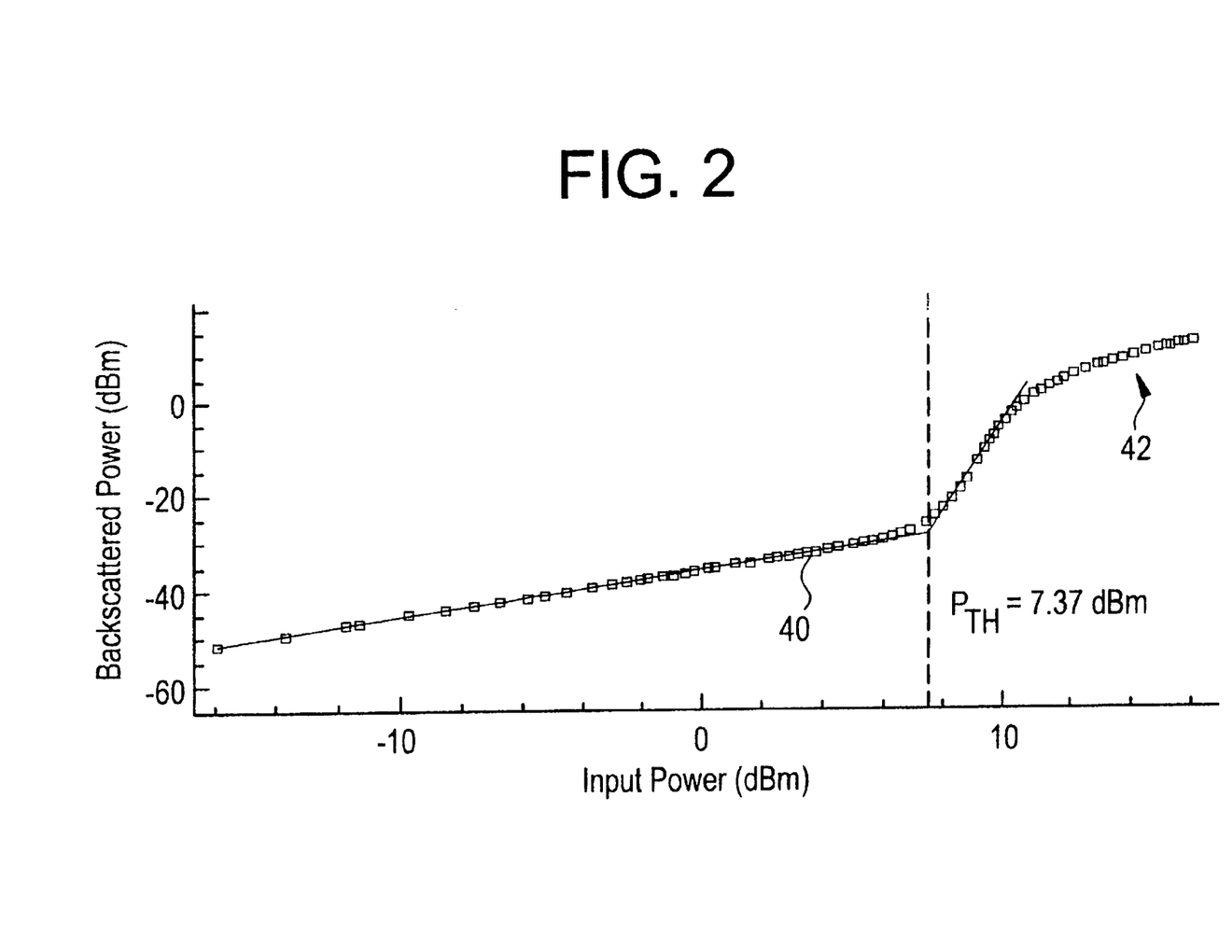
FIG. 2 is a plot of backscattered power v. input power for a sample length of fiber.

With reference again to FIGS. 1A–1D, a backscattered wave having an intensity suitable for the purposes of the present invention is achieved by ensuring that first wave 18 propagating though Brillouin fiber 22 is significantly above the Brillouin threshold for the fiber. A plot 40 showing the dependence of backscattered power v. input power for a 20 km length of fiber is shown in FIG. 2. In the region below 7.37 dBm of input power, the backscattered power is dominated by Rayleigh backscattering. The abrupt slope change at 7.37 dBm is due to the addition of simulated Brillouin scattering. The threshold power corresponds to this point of discontinuous slope and is also where there is approximately equal Rayleigh and Brillouin contributions to the backscatter. For this invention, it is necessary to operate above the threshold where the coherent property of stimulated Brillouin scattering provides good interference with the input wave.

Figure 3:
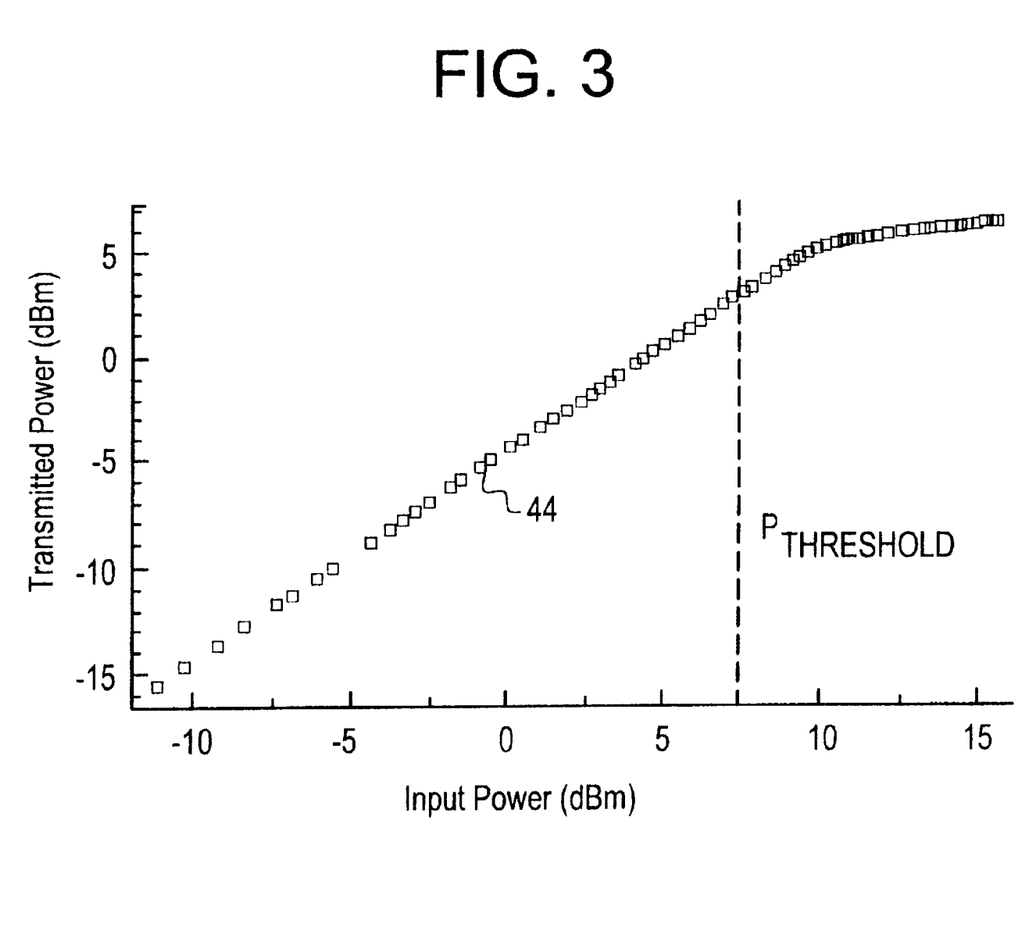
FIG. 3 is a plot of transmitted power v. input power for a sample length of fiber.

A plot 44 showing the dependence of transmitted power v. input power for the same 20 km length of fiber as in FIG. 2 is shown in FIG. 3. Above the threshold power of 7.37 dBm, as more power is backscattered, the faction of the transmitted power decreases. It grows sublinearly just above the threshold power and asymptotically approaches a constant value at higher input powers. In the embodiments of FIGS. 1B and 1C, this transmitted light is used as the non-downshifted input to the interfering coupler 26. It can be shown from FIGS. 2 and 3 that there exists an input power such that the backscattered and transmitted power interfering at coupler 26 are equal. This yields a temporal profile at high contrast with no continuous wave background which is important for high quality soliton pulse generation.

It is preferred that Brillouin fiber 22 have a Brillouin threshold as low as is practical to minimize the amount of input power necessary to achieve a stable backscattered wave.

The Brillouin threshold for Brillouin fiber 26 is given by $$P_{th} \cong 21 \frac{A_{eff}}{g_B L_{eff}} \qquad \text{Equation 1}$$

where $A_{eff}$ is the effective core area of the fiber, $L_{eff}$ is the effective interaction length of the fiber, and $g_B$ is the Brillouin gain coefficient. Thus, it is seen that the Brillouin threshold can be decreased by decreasing the effective core area of Brillouin fiber 22, increasing the effective interaction length of Brillouin fiber 22, or by increasing the Brillouin gain of the fiber. Table 1 illustrates the impact of fiber length on the Brillouin power threshold for fiber samples having an effective core area of about 50 mm², a fiber loss of 0.2 dB/km, and a peak Brillouin gain of about $2.4 \times 10^{-11}$ m/w.

TABLE 1

| Fiber Length (km) | SBS Threshold Power (dBm) |
|---|---|
| 5 | 9.895 |
| 10 | 8.174 |
| 20 | 7.130 |
| 30 | 6.060 |

While a maximally long fiber in excess of 30 km minimizes the Brillouin threshold and therefore is preferred in terms of performance, a lower-cost fiber having a length of about 5 km is suitable for the purposes of the invention.

For generating a stable and controllable backscattered wave in Brillouin fiber 22, the power level of pump continuous wave 12 and the coupling ratio of first coupler 16 should be coordinated so that the power level of first wave 18 coupled into Brillouin fiber 22 is significantly above the Brillouin threshold for the fiber.

Backscattered wave 28 generated by Brillouin scattering of first continuous wave 18 will have a center wavelength that is shifted in frequency from first continuous wave 18. The frequency shift, $v_{SH}$, of backscattered wave 28 with respect to first wave 18 is given by $$v_{SH} = \frac{2n\gamma_A}{\lambda_1} \qquad \text{Equation 2}$$

where n is the refractive index of the fiber, $\gamma_A$, is the fiber acoustic velocity, and $\lambda_1$ is the center wavelength of first continuous wave 18.

It is noted that the magnitude of the frequency shift is independent of the input power level. Therefore, in the present invention the magnitude of the frequency shift of backscattered wave 28 will remain constant despite slight (or large) fluctuations of the input power of first continuous wave 18. It is noted also from Eq. 2 that the magnitude of the frequency shift is essentially independent of the input wavelength, $\lambda_1$. For example, a 1 nm change in a 1550 nm wavelength input wave changes the frequency shift by only ~7 Mhz. Because backscattered wave 28 has a wavelength shift independent of input power, and essentially independent of input wavelength, the sinusoidal output 30 generated at the output of second coupler 26 will be highly stable and controllable.

Applying a 1550 nm wavelength input wave into a Brillouin fiber 22 having a refractive index of about 1.5 and an acoustic velocity of about 600 m/s results in an output wave at output fiber 33 having a frequency of about 11.2 GHz. The frequency of the output wave can be adjusted toward a predetermined frequency utilizing its dependence on temperature.

The temperature dependence of the Brillouin frequency, $v_b$, can be expressed as the temperature differential of equation (2):

$$\frac{dv_{SH}}{dT} = \frac{2}{\lambda_1}\left(v_A \frac{dn}{dT} + n\frac{dv_A}{dT}\right) \qquad \text{Equation 3}$$

The temperature dependence of both the refractive index and acoustic velocity combine to give the total temperature dependence of the Brillouin frequency. Accordingly, it can be seen that the frequency of the output wave can be changed by adjusting the temperature. The temperature of Brillouin fiber 22 can be conveniently adjusted by heating Brillouin fiber with use of a fiber heating oven. The total, $dv_{SH}/dT$, is approximately 1.2 MHz per degree C. For a practical temperature range of 100 degrees, the Brillouin frequency can be changed from about 11.2 Ghz to about 11.3 GHz.

When second continuous wave 20 and backscattered wave 28 are input into second coupler 26, the two continuous waves having unequal wavelengths are mixed (or beat) to generate a sinusoidal signal having frequency equal to the difference in frequency between the second continuous wave 20 and backscattered continuous wave 28. The intensity of the output signal 30 can be expressed by:

$$I_{out} = |E_{out}|^2 = |\vec{E}_{CW} + \vec{E}_B|^2 \qquad \text{Equation 4}$$

$$= |E_{CW}|^2 + |E_B|^2 + E_{CW}E_B(e^{i\pi(\gamma CW - \gamma B)t} + e^{-i2\pi(\gamma CW - \gamma B)t}) \qquad \text{Equation 5}$$

$$= |E_{CW}|^2 + |E_B|^2 + E_{CW}E_B \cos(2\pi\gamma_{OUT}\tau) \qquad \text{Equation 6}$$

Where $E_{cw}$ is the amplitude of the second continuous wave 20, $E_B$ is the amplitude of the backscattered wave 28, $\gamma_{cw}$ is the frequency of wave 20, $\gamma_B$ is the frequency of wave 28, and $\gamma_{OUT} = \gamma_{cw} - \gamma_B$ is the difference frequency which is equal to the frequency shift, $\gamma_{SH}$, because $\gamma_B = \gamma_{CW} - \gamma_{SH}$. The quality of sinusoidal output signal 30 is optimized if second continuous wave 20 and backscattered wave 28 are made to have approximately equal power levels. In that case, $E_{cw} = E_B = E$ and the above equation becomes $I_{OUT} = 2|E|^2(1+\cos 2\pi\gamma_{SH}\tau)$. Because cos will vary between +1 and −1 over time, the output intensity will vary between $+4|E|^2$ and 0. Therefore, coupling continuous waves at equal power levels (intensities) results in a maximum contrast ratio (or fringe visibility) of the interference pattern. On the other hand, when $E_{cw} \gg E_B$, than the above equation becomes $I_{OUT} \approx |E_{CW}|^2 + 2E_{CW}E_B \cos 2\pi\gamma_{SH}t$. Since $E_B$ is small, the second modulating term is much smaller than the continuous wave first term.

Referring again to FIG. 1, the intensities of second wave 20 and backscattered wave 28 can be made equal by implementing one of several different methods. Backscattered wave 28 normally has an intensity much less than first continuous wave 18 (which generates backscattered wave 28) and will experience loss in intensity when propagating though input coupler 16 and through second coupler 26.

Therefore, equalizing the intensities of second wave 20 and backscattered waves 28 will normally involve increasing the intensity of backscattered wave 28 and/or decreasing the intensity of second continuous wave 20. In one method of the invention, fiber 46 transmitting backscattered wave 28 may have installed therein an amplifier for amplifying the intensity of backscattered wave. For amplification at around 1550 nm wavelengths, an erbium-doped fiber amplifier is suitable. In another intensity equalization method, second continuous wave 20 may be attenuated by installing an attenuator in fiber 24 transmitting second continuous wave 20.

The most preferred method for equalizing the intensities of backscattered wave 28 and second continuous wave 20 involves selecting a coupling ratio for second coupler 26 such that backscattered wave 28 and second continuous wave 20 couple at equivalent intensities into output fiber 33. The appropriate coupling ratio is equal to the ratio of the inverse of the input powers to the coupler, i.e., 1/backscatter power: 1/continuous power. For example, if the backscattered power at the input to 26 is 0.1 times the continuous power, the coupling ratio would be 10:1.

An important consideration in the design of the pulse generator is to ensure that Brillouin scattering is not stimulated in output fiber 33 at output of the second coupler 26. Unwanted Brillouin scattering in output fiber 33 can be avoided generally by increasing the Brillouin threshold of output fiber 33 above the power level of output 30. Actually, since output wave 30 is composed of two distinct frequency components (for $E_{cw} = E_B$), each component needs to be below the threshold power or the total power needs to be below twice the threshold power.

Prior art teaches that fiber 34 can be composed of alternating sections of standard single mode fiber and dispersion-shifted single mode fiber. Instead of a small local imbalance between self phase modulation and group velocity dispersion throughout a fiber whose dispersion continuously decreases, alternating sections spatially separate the effects of self phase modulation and dispersion. Careful choice of lengths of each section will allow the input optical sinusoidal wave to be adiabatically compressed into a soliton pulse train. It is anticipated that such a fiber would be easier to make than dispersion decreasing fiber. The component fibers are readily available and accurate control of the section lengths is not difficult to achieve. An additional advantage important for our application is that the Brillouin threshold power in the composite fiber increases by approximately 3 dB over the use of a single fiber type. The acoustic phonon spectrum of each fiber type acts independently.

The result is that the composite fiber appears half as long.

The Brillouin threshold of output fiber 33 can be increased to avoid unwanted Brillouin scattering by decreasing the peak Brillouin gain, $g_B$ in output fiber 33. The peak Brillouin gain of a fiber is given by $$g_B = \frac{\Delta\gamma_B}{\Delta\gamma_B + \Delta\gamma_P} g \qquad \text{Equation 7}$$

where $\Delta\gamma_p$ is the spectral width of the input wave, and $\Delta\gamma_B$ is the spectral width of the phonon energy spectrum $g_p$, the peak Brillouin gain coefficient, is given by $$g_p \frac{2\pi n^7 p_{12}^2}{c\lambda_p^2 p_0 \gamma_A \Delta\gamma_B} \qquad \text{Equation 8}$$

where n is the refractive index, $p_2$ is the longitudinal elasto-optic coefficient, $p_o$ is the material density, and $\lambda_p$ is the input wavelength.

It is seen from Eq. 7 that the Brillouin gain of a fiber can be controlled by adjusting the spectral width of the input wave. A large Brillouin gain (and thus, as seen from Eq. 1, a small Brillouin threshold) is achieved by minimizing the spectral width for the input wave. For input spectral widths approaching zero, it is seen from equation 4 that the Brillouin gain approaches the peak Brillouin gain coefficient. By contrast, as the input spectral width becomes large in relation to the backscattered spectrum, the Brillouin gain approaches zero. Therefore, a small Brillouin gain can be achieved by broadening the spectral profile of the input wave.

In the present invention, a large Brillouin gain is desired in Brillouin fiber 22 so that Brillouin scattering is stimulated, and a strong backscattered wave is generated, but a large Brillouin gain is not desired in output fiber 33, so as to avoid SBS in output fiber 33. A large Brillouin gain in Brillouin fiber 22 is provided, in part, by applying a narrow-spectrum input wave (first continuous wave 18) into Brillouin fiber 22. A small Brillouin gain in output fiber 33 may be provided by applying a broad-spectrum input signal into output fiber 33. The input signal applied to output fiber 33 is the coupler output of first continuous wave 20 coupled with backscattered wave 28. Because the coupler output will have a spectral profile proximate the larger of the two input spectrums, a broad-spectrum input signal into output fiber 33 can be generated by providing a broad-spectrum backscattered wave 28. While it is seen from Eq. 8 that a broad spectrum backscattered wave will decrease the peak Brillouin gain coefficient, and thus, will decrease the Brillouin gain in Brillouin fiber 22, the added inefficiency of the SBS process in Brillouin fiber 22 is tolerated in the interest of reducing the risk of SBS occurring at output fiber 33.

Spectral broadening of the acoustic energy spectrum in the output fiber can be accomplished by one of several methods including by a nonuniform refractive index profile or fiber draw tension along the axis of propagation. Various methods for controlling stimulated Brillouin scattering are discussed in application Ser. No. 60/052,616 filed Jul. 15, 1997 entitled Suppression of Stimulated Brillouin Scattering in Optical Fiber, which is assigned to the assignee of the present invention and incorporated herein by reference.

The Brillouin threshold of output fiber 33 can also be increased so as to avoid generating SBS in output fiber 33 by increasing the effective core area of output fiber 33, or by decreasing the interaction length of output fiber 33.

Stable sinusoidal output 30 from second coupler 26 may be transformed into a train of soliton pulses at a high repetition rate by applying the sinusoidal output to a dispersion decreasing fiber 34 as illustrated in FIG. 1. Dispersion decreasing fibers can be made by tapering the core diameter of a length of fiber during the manufacturing process. In the present invention, dispersion-decreasing fiber 34 can be made by any number of techniques, e.g., axially tapering the core diameter or axially varying the refractive index profile during the glass forming process or axially varying the fiber cladding diameter during the fiber drawing process. The dispersion profile D(z) along the fiber length, z, is of the form $D(z)=D(0) \exp(-Az)/(1+Bz)$ where A and B are constants. These constants are chosen to satisfy two conditions:

The rate of dispersion change is faster than the optical attenuation rate in the fiber.

The rate of dispersion change is slow on the dispersive length scale.

The first condition ensures that the width of the input waveform (in this case, the sinusoidal wave) will be compressed as the waveform propagates along the fiber. This condition means that the optical nonlinearity known as self phase modulation is stronger than the fiber dispersion. As a result, new frequency components are generated upon propagation which serves to narrow the pulse in the temporal domain. The second condition ensures that this imbalance between self phase modulation and dispersion is not too large so that the compression process occurs adiabatically (slowly). Nonadiabatic compression will result in a frequency variation across the pulse (known as chirp) that leads to energy being shed from the pulse (known as dispersive waves). The dispersive length of a pulse is defined as the dispersion divided by the square of the pulse width. It is the length scale upon which the pulse can react to changes in dispersion. Therefore, for a gradual, adiabatic pulse width change, the dispersion change should occur over several dispersive lengths.

For a 10 Ghz sinusoidal waveform whose full width at half its maximum value is 33 ps, the dispersive length required by output fiber 33 would be in the tens of kilometers (depending on the fiber dispersion). This may be an impractically long length for compression to a soliton pulse train. In fact, past work has only been able to demonstrate sinusoidal compression for frequencies greater than 20 Ghz. However, recent simulations by Quiroga-Teixeiro, et al., "Efficient soliton compression by fast adiabatic amplification", J. Opt. Soc. Am. B, p. 687, no. 4, v. 13 (1996) suggest that compression is possible within one dispersive length in fibers with rapidly increasing distributed amplification. To reduce the compression length still further, they suggest a series of fibers with discrete amplification followed by fibers that nonlinearly convert the resultant higher-order soliton modes back to the fundamental mode. For the present application, this should reduce the compression length to below 10 km.

Figure 4:
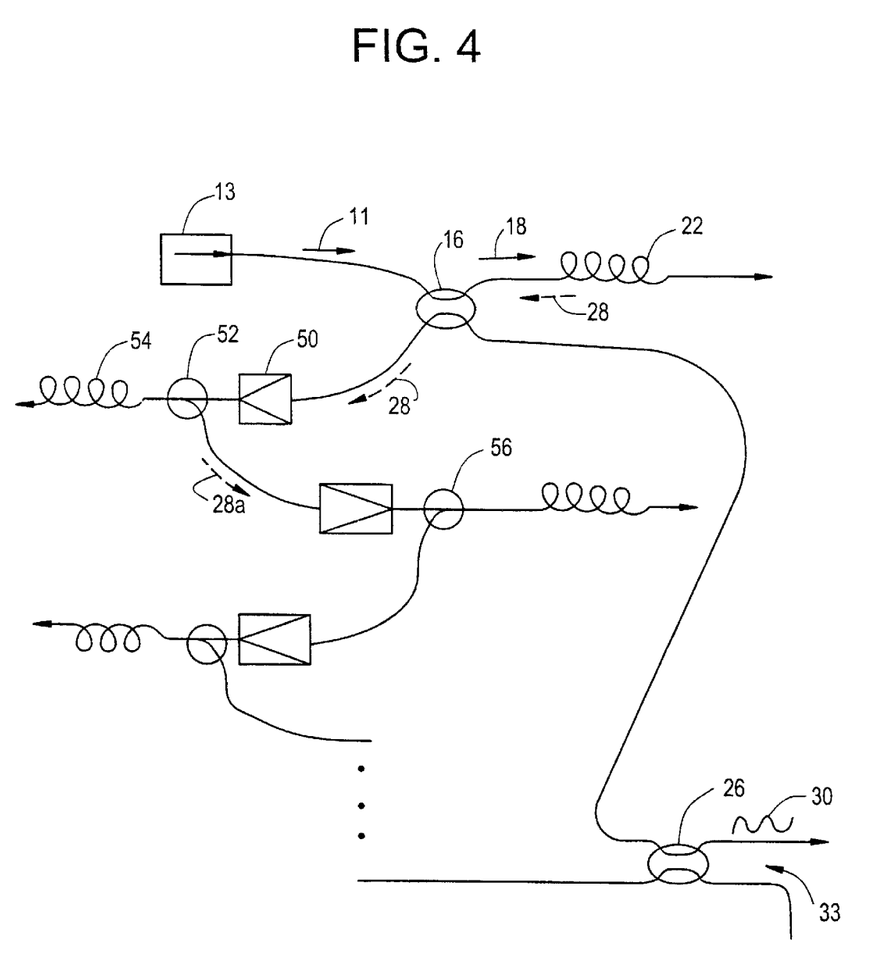
FIG. 4 is a general schematic diagram of an optical circuit comprising a plurality of cascaded Brillouin fibers.

The length requirements of output fiber 33 can also be decreased by providing the optical circuit configuration shown in FIG. 4. In this configuration, backscattered wave 28 is not coupled directly into coupler 26 as in the configurations shown in FIGS. 1A–1D. Instead, the output of backscattered wave 28 is amplified by amplifier 50 and input into second Brillouin fiber 54 adapted similarly to first Brillouin fiber 22 so that Brillouin scattering is stimulated therein. Backscattered wave 28a stimulated in second Brillouin fiber 54 may then be input into coupler 26 or else may be amplified and input into third Brillouin fiber 56. Given Brillouin fibers having similar characteristics, the frequency, $\gamma_{out}$, of sinusoidal output wave 30 can be expressed as $N \gamma_{out}$, where N is the number of cascaded Brillouin fibers provided in the circuit, and $\gamma_{out}$ is frequency of output wave 30 which would result from coupling incident wave 18 with backscattered wave 28 of first Brillouin fiber 28.

Sinusoidal output 30 may also be compressed to generate a soliton pulse train by inputting sinusoidal output 30 into a fiber-grating pulse compressor. By subtracting the compression stage altogether, it will be seen that the present invention provides a highly stable and controllable source of microwaves.

Figure 5:
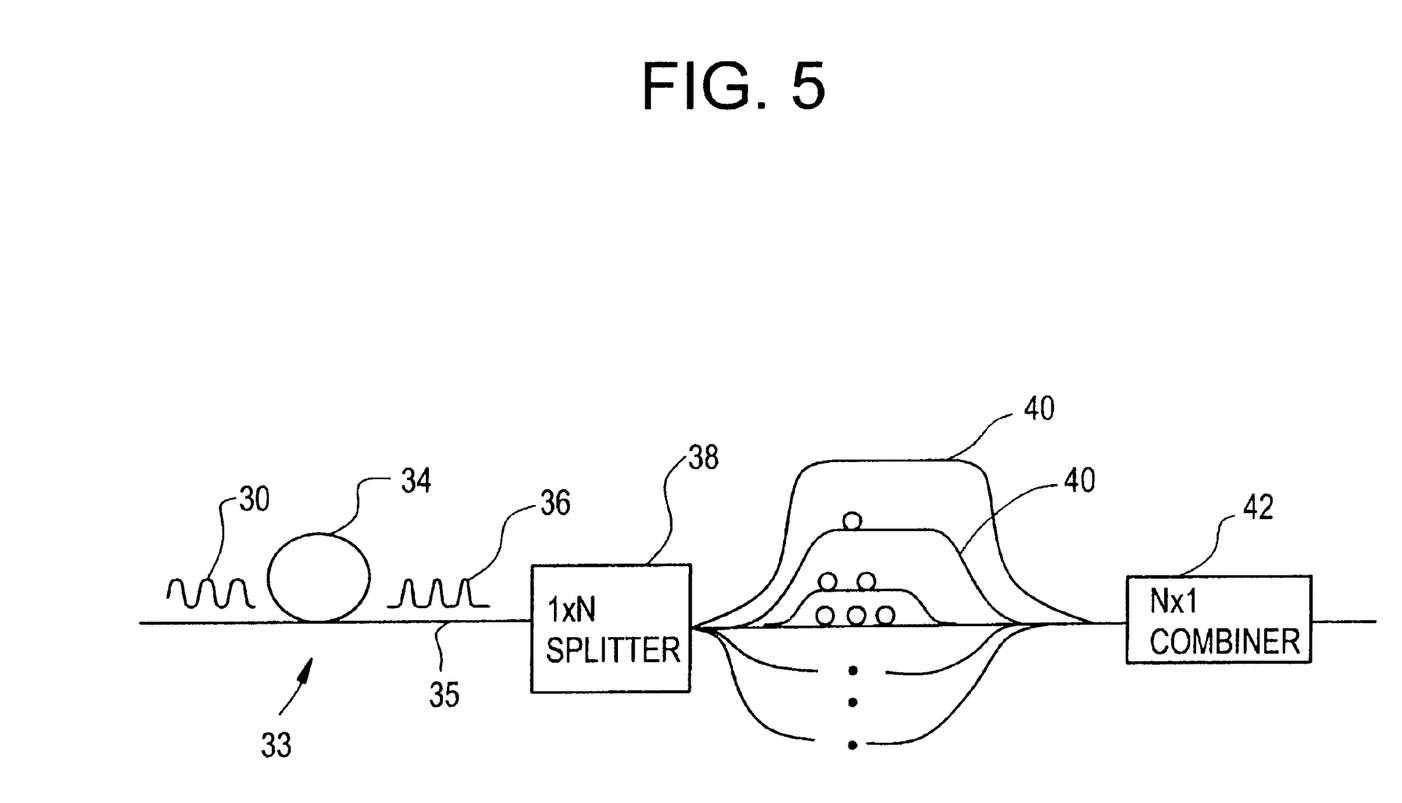
FIG. 5 is a general schematic diagram showing time division multiplexing of a soliton pulse train.

The ~10 Gbs repetition rate generated by pulse generator 10 can easily be increased by a factor of N×10 Gbs, where N is an integer, by way of time division multiplexing. In time division multiplexing, the ~10 Gbs pulse train is split using a 1×N coupler 38 as shown in FIG. 5. Each output path 40 is delayed by Tb/N (where Tb is the bit period in picoseconds) using either short lengths of fiber or in integrated optical planar channel waveguides to interleave the pulses. For example, a 1 ps delay is achieved in a ~0.2 mm length. Each individual-path is encoded with data from, for example, an electro-optic modulator, and the path are recombined using an N×1 coupler 42.

In summary, two approaches to increase the fundamental Brillouin repetition rate have been described. The first cascades Brillouin fibers via 1×2 optical couplers to generate a higher repetition soliton pulse train before the data encoding; the second uses the technique of optical time division multiplexing to split, individually data encode, and recombine a number of channels.

While the present invention has been described with reference to a number of specific embodiments, it will be understood that the spirit and scope of the present invention should be determined with reference to the appended claims.

We claim:

1. A method for use in generating a soliton pulse train, said method comprising the steps of:
   providing an input continuous wave;
   stimulating Brillouin scattering of an input wave having a frequency determined by said input continuous wave to generate a backscattered wave;
   coupling a continuous wave having a frequency determined by said input continuous wave with said backscattered wave to generate a sinusoidal output wave.

2. The method of claim 1, wherein said input wave is input into a Brillouin fiber having a Brillouin threshold, and wherein said stimulating step includes the step of adjusting an effective core area of said Brillouin fiber to reduce said Brillouin threshold of said Brillouin fiber.

3. The method of claim 1, wherein said input wave is input into a Brillouin fiber having a Brillouin threshold, and wherein said stimulating step includes the step of adjusting an effective interaction length of said Brillouin fiber to reduce said Brillouin threshold of said Brillouin fiber.

4. The method of claim 1, wherein said input wave is input into a Brillouin fiber having a Brillouin threshold, and wherein said stimulating step includes the step of adjusting a temperature of said Brillouin fiber to adjust said wavelength shift of said backscattered wave.

5. The method of claim 1, wherein said input wave is input into a Brillouin fiber, and wherein said stimulating step includes the step of adjusting an acoustic velocity of said Brillouin fiber to adjust a wavelength shift of said backscattered wave.

6. The method of claim 1, wherein said input wave is input into a Brillouin fiber, and wherein said stimulating step includes the step of adjusting a refractive index of said Brillouin fiber to adjust a wavelength shift of said backscattered wave.

7. The method of claim 1, wherein said stimulating step includes the steps of:
   presenting said input continuous wave to a first coupler to generate said input wave; and
   providing a Brillouin fiber at an output of said first coupler, said Brillouin fiber adapted to generate said backscattered wave.

8. The method of claim 1, wherein said stimulating step includes the steps of:
   presenting said input continuous wave to a first coupler to generate said input wave, said first coupler provided by an optical circulator; and
   providing a Brillouin fiber at an output of said first coupler, said Brillouin fiber adapted to generate said backscattered wave.

9. The method of claim 1, wherein said stimulating step includes the step of providing a Brillouin laser for generating said backscattered wave.

10. The method of claim 1, wherein said stimulating step includes the steps of:
    providing a Brillouin laser for generating said backscattered wave;
    applying said input continuous wave to a first coupler to produce a Brillouin laser input wave having a frequency determined by said input continuous wave;
    inputting said Brillouin laser input wave into a Brillouin laser coupler for generating said input wave for input into said Brillouin laser.

11. The method of claim 1, wherein said stimulating step includes the step of providing a plurality of Brillouin fibers in a cascaded network, and of applying a backscattered wave of at least one of said Brillouin fibers into a next Brillouin fiber of said network.

12. The method of claim 1, wherein said stimulating step includes the steps of:
    providing at least first and second Brillouin fibers in a cascaded network, said first Brillouin fiber generating a first backscattered wave;
    amplifying said first backscattered wave to produce an amplified first backscattered wave;
    presenting said amplified backscattered wave to said second Brillouin fiber to generate a second backscattered wave.

13. The method of claim 12, further comprising the steps of:
    providing a third Brillouin fiber; and
    amplifying and applying said second backscattered wave to said third Brillouin fiber.

14. The method of claim 1, wherein said stimulating step includes the steps of:
    providing at least first and second Brillouin fibers in a cascaded network, said first Brillouin fiber generating a first backscattered wave;
    amplifying said first backscattered wave to produce an amplified first backscattered wave;
    presenting said amplified first backscattered wave to said second Brillouin fiber to generate a second backscattered wave,
    wherein said coupling step includes the step of coupling said input continuous wave with said second backscattered wave.

15. The method of claim 1, wherein said coupling step further includes the step of equalizing the intensities of said continuous wave and said backscattered wave to generate a high quality sinusoidal output signal.

16. The method of claim 1, wherein said coupling step further includes the step of equalizing the intensities of said continuous wave and said backscattered wave to generate a high quality sinusoidal output signal, said equalizing step including the step of amplifying said continuous wave or said backscattered wave.

17. The method of claim 1, wherein said coupling step further includes the step of equalizing the intensities of said continuous wave and said backscattered wave to generate a high quality sinusoidal output signal, said equalizing step including the step of attenuating said continuous wave or said backscattered wave.

18. The method of claim 1, wherein said coupling step further includes the step of equalizing the intensities of said continuous wave and said backscattered wave to generate a high quality sinusoidal output signal, and wherein said continuous wave and said backscattered wave are coupled in a coupler, said equalizing step including the step of selecting a coupling ratio for said coupler so that said second wave and said backscattered wave are coupled at equal intensities.

19. The method of claim 1, said method further including the step, after said coupling step, of preventing Brillouin scattering of said sinusoidal output wave.

20. The method of claim 1, wherein said output wave is applied to an output fiber, and wherein said stimulating step includes the step of broadening an acoustic energy spectrum of said output fiber to increase a Brillouin threshold of said output fiber.

21. The method of claim 1, wherein said input wave is applied to a Brillouin fiber, wherein said output wave is applied to an output fiber, and wherein said stimulating step includes the step of introducing nonuniformities into said output fiber so that an acoustic energy spectrum of said output fiber is broadened, whereby a Brillouin threshold of said output fiber is increased.

22. The method of claim 1, wherein said input wave is applied to a Brillouin fiber, wherein said output wave is applied to an output fiber, and wherein said stimulating step includes the step of doping said Brillouin fiber so that an acoustic energy spectrum of said Brillouin fiber is broadened, whereby a Brillouin threshold of said output fiber is increased.

23. The method of claim 1, wherein said input wave is applied to a Brillouin fiber, wherein said output wave is applied to an output fiber, and wherein said stimulating step includes the step of varying the draw tension of said Brillouin fiber so that an acoustic energy spectrum of said Brillouin fiber is broadened, whereby a Brillouin threshold of said output fiber is increased.

24. The method of claim 1, further comprising the step of compressing said sinusoidal output wave to generate a train of soliton pulses.

25. The method of claim 1, further comprising the step of compressing said sinusoidal output wave using an output fiber adapted for rapidly increasing distributed amplification.

26. The method of claim 1, further comprising the step of compressing said sinusoidal output wave using a dispersion decreasing fiber.

27. The method of claim 1, further comprising the steps of:
compressing said sinusoidal output wave to generate a train of soliton pulses;
dividing said soliton pulse train into a plurality of fanout pulse trains;
time delaying each of said pulse trains;
encoding data on each of said pulse trains;
recombining the plurality of fanout pulse trains.

28. An apparatus for use in generating a soliton pulse train, said apparatus comprising:
means for providing an input continuous wave;
means for developing an input wave having a frequency determined by said input continuous wave;
means for producing a continuous wave having a frequency determined by said input continuous wave;
stimulating means for stimulating Brillouin scattering of said input wave to generate a backscattered wave;
coupling means for coupling said continuous wave with said backscattered wave to generate a sinusoidal output wave.

29. The apparatus of claim 28, wherein said input wave is input into a Brillouin fiber having a Brillouin threshold, and wherein said stimulating means includes means for adjusting an effective core area of said Brillouin fiber to reduce said Brillouin threshold of said Brillouin fiber.

30. The apparatus of claim 28, wherein said input wave is input into a Brillouin fiber having a Brillouin threshold, and wherein said stimulating means includes means for adjusting an effective interaction length of said Brillouin fiber to reduce said Brillouin threshold of said Brillouin fiber.

31. The apparatus of claim 28, wherein said input wave is input into a Brillouin fiber having a Brillouin threshold, and wherein said stimulating means includes means for adjusting a temperature of said Brillouin fiber to adjust a wavelength shift of said backscattered wave.

32. The apparatus of claim 28, wherein said input wave is input into a Brillouin fiber, and wherein said stimulating means includes means for adjusting an acoustic velocity of said Brillouin fiber to adjust a wavelength shift of said backscattered wave.

33. The apparatus of claim 28, wherein said input wave is input into a Brillouin fiber, and wherein said stimulating means includes means for adjusting a refractive index of said Brillouin fiber to adjust a wavelength shift of said backscattered wave.

34. The apparatus of claim 28, wherein said stimulating means includes:
first coupler means for generating said input wave from said input continuous wave; and
a Brillouin fiber connected at an output of said first coupler, said Brillouin fiber adapted to generate said backscattered wave.

35. The apparatus of claim 28, wherein said stimulating means includes:
first coupler means for generating said input wave from said input continuous wave, said first coupler means provided by an optical circulator; and
a Brillouin fiber connected at an output of said first coupler, said Brillouin fiber adapted to generate said backscattered wave.

36. The apparatus of claim 28, wherein said stimulating means includes a Brillouin laser for generating said backscattered wave.

37. The apparatus of claim 28, wherein said stimulating means includes:
a Brillouin laser for generating said backscattered wave;
first coupler means for producing a Brillouin laser input wave having a frequency determined by said input continuous wave; and
a Brillouin laser coupler for generating from said Brillouin laser input wave said input wave for input into said Brillouin laser.

38. The apparatus of claim 28, wherein said stimulating means includes a plurality of Brillouin fibers in a cascaded network, wherein a backscattered wave of at least one of said Brillouin fibers is input into a next Brillouin fiber of said network.

39. The apparatus of claim 28, wherein said stimulating means includes:
at least first and second Brillouin fibers in a cascaded network, said first Brillouin fiber generating a first backscattered wave;
means for amplifying said first backscattered wave to produce an amplified first backscattered wave, wherein said amplified backscattered wave is presented to said second Brillouin fiber to generate a second backscattered wave.

40. The apparatus of claim 28, wherein said coupling means further includes means for equalizing the intensities of said continuous wave and said backscattered wave to generate a high quality sinusoidal output signal.

41. The apparatus of claim 28, wherein said coupling means further includes means for equalizing the intensities of said continuous wave and said backscattered wave to generate a high quality sinusoidal output signal, said equalizing means including means for amplifying said continuous wave or said backscattered wave.

42. The apparatus of claim 28, wherein said coupling means further includes means for equalizing the intensities of said continuous wave and said backscattered wave to generate a high quality sinusoidal output signal, said equalizing means including means for attenuating said continuous wave or said backscattered wave.

43. The apparatus of claim 28, said apparatus further including means for preventing Brillouin scattering of said sinusoidal output wave.

44. The apparatus of claim 28, further including an output fiber receiving said output wave, wherein said stimulating means includes means for broadening an acoustic energy spectrum of said output fiber to increase a Brillouin threshold of said output fiber.

45. The apparatus of claim 28, wherein said input wave is applied to a Brillouin fiber, wherein said output wave is applied to an output fiber, and wherein said output fiber includes nonuniformities so that an acoustic energy spectrum of said output fiber is broadened, whereby a Brillouin threshold of said output fiber is increased.

46. The apparatus of claim 28, wherein said input wave is applied to a Brillouin fiber, wherein said output wave is applied to an output fiber, and wherein said Brillouin fiber is doped so that an acoustic energy spectrum of said Brillouin fiber is broadened, whereby a Brillouin threshold of said output fiber is increased.

47. The apparatus of claim 28, wherein said input wave is applied to a Brillouin fiber, wherein said output wave is applied to an output fiber, and wherein said Brillouin fiber includes sections of varying draw tension so that an acoustic energy spectrum of said Brillouin fiber is broadened, whereby a Brillouin threshold of said output fiber is increased.

48. The apparatus of claim 28, further comprising means for compressing said sinusoidal output wave to generate a train of soliton pulses.

49. The apparatus of claim 28, further comprising an output fiber receiving said output wave, said output fiber adapted for rapidly increasing distributed amplification, so that said output fiber compresses said sinusoidal output wave to generate a train of soliton pulses.

50. The apparatus of claim 28, further comprising an output fiber receiving said output wave, said output fiber including a dispersion decreasing fiber for compressing said output wave to generate a train of soliton pulses.

51. The apparatus of claim 28, further comprising:
means for compressing said sinusoidal output wave to generate a train of soliton pulses;
means for dividing said soliton pulse train into a plurality of fanout pulse trains;
means for time delaying each of said pulse trains;
means for recombining the plurality of fanout pulse trains.

52. The apparatus of claim 51, further comprising means for encoding data on at least one of said fanout pulse trains.

* * * * *